(12) United States Patent
Saiki

(10) Patent No.: US 10,291,858 B2
(45) Date of Patent: May 14, 2019

(54) IMAGING APPARATUS INCLUDING TWO OPERATION PARTS FOR DETERMINING A SET VALUE

(71) Applicant: PANASONIC INTELLECTUAL PROPERTY MANAGEMENT CO., LTD., Osaka (JP)

(72) Inventor: Jun Saiki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/893,600

(22) Filed: Feb. 10, 2018

(65) Prior Publication Data

US 2018/0302541 A1    Oct. 18, 2018

(30) Foreign Application Priority Data

Apr. 14, 2017   (JP) ................................. 2017-080184
Nov. 17, 2017   (JP) ................................. 2017-221396

(51) Int. Cl.
| H04N 5/225 | (2006.01) |
| H04N 5/235 | (2006.01) |
| H04N 5/232 | (2006.01) |
| G03B 17/06 | (2006.01) |
| H04N 9/04 | (2006.01) |

(52) U.S. Cl.
CPC ............ *H04N 5/235* (2013.01); *G03B 17/06* (2013.01); *H04N 5/2252* (2013.01); *H04N 5/23216* (2013.01); *G03B 2217/002* (2013.01)

(58) Field of Classification Search
CPC .. H04N 5/2252; H04N 5/235; G03B 2217/00; G03B 2217/002; G03B 17/02; G03B 17/06
See application file for complete search history.

(56) References Cited

U.S. PATENT DOCUMENTS

| 5,761,554 | A | 6/1998 | Kirigaya et al. |
| 6,122,451 | A | 9/2000 | Ohsawa et al. |
| 6,427,052 | B1 * | 7/2002 | Ogi ........................ G03B 17/18 |
| | | | 396/222 |
| 7,042,510 | B2 * | 5/2006 | Kurahashi ............ H04N 5/2251 |
| | | | 348/207.99 |
| 7,539,408 | B2 * | 5/2009 | Ueda ...................... G03B 7/095 |
| | | | 396/257 |
| 8,203,641 | B2 * | 6/2012 | Mori .................... H04N 5/2356 |
| | | | 348/333.12 |

FOREIGN PATENT DOCUMENTS

| JP | 07-311398 A | 11/1995 |
| JP | 10-104713 A | 4/1998 |
| JP | 11-160751 A | 6/1999 |

* cited by examiner

*Primary Examiner* — Ngoc Yen T Vu
(74) *Attorney, Agent, or Firm* — Renner Otto Boisselle & Sklar, LLP

(57) ABSTRACT

An object of the present disclosure is to improve operability of an imaging apparatus. The present disclosure is an imaging apparatus including: first operation part 15 for receiving selection of a first numerical value from a first numerical value group that specifies a photography setting condition; second operation part 14 for receiving selection of an operation from an operation group for the first numerical value; and a controller for determining a set value set by combining the first numerical value selected via first operation part 15 and the operation selected via the second operation part 14.

5 Claims, 7 Drawing Sheets

FIG. 4A

| | +5 | | | +4 | | | +3 | | | +2 | | | +1 | | | +0 | | | -1 | | | -2 | | | -3 | | | -4 | | | -5 | |
|---|---|---|---|---|---|---|---|---|---|---|---|---|---|---|---|---|---|---|---|---|---|---|---|---|---|---|---|---|---|---|---|---|
| ±3EV | | | | | | | 1 | 2 | 3 | 4 | 5 | 6 | 7 | 8 | 9 | 10 | 11 | 12 | 13 | 14 | 15 | 16 | 17 | 18 | 19 | | | | | | | 19 position |
| ±5EV | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 31 position |

FIG. 4B

| | +5 | | | +4 | | | +3 | | | +2 | | | +1 | | | +0 +/- CHANGEOVER | |
|---|---|---|---|---|---|---|---|---|---|---|---|---|---|---|---|---|---|
| ±5EV | 1 | 2 | 3 | 4 | 5 | 6 | 7 | 8 | 9 | 10 | 11 | 12 | 13 | 14 | 15 | 16 | 16 position |

FIG. 7

| ±5EV | +5 | +4 | +3 | +2 | +1 | +0 | -1 | -2 | -3 | -4 | -5 | +1/3 / -1/3 CHANGEOVER |
|---|---|---|---|---|---|---|---|---|---|---|---|---|
| | 1 | 2 | 3 | 4 | 5 | 6 | 7 | 8 | 9 | 10 | 11 | 11 position |

IMAGING APPARATUS INCLUDING TWO OPERATION PARTS FOR DETERMINING A SET VALUE

BACKGROUND

1. Technical Field

The present disclosure relates to an imaging apparatus.

2. Description of the Related Art

An exposure correction device in Unexamined Japanese Patent Publication No. 10-104713 has a configuration capable of selecting an exposure correction value stepwise by using a single exposure correction dial.

SUMMARY

The present disclosure is an imaging apparatus including: a first operation part for receiving selection of a first numerical value from a first numerical value group that specifies a photography setting condition; a second operation part for receiving selection of an operation from an operation group for the first numerical value; and a controller which determines a set value set by combining the first numerical value selected via the first operation part and the operation selected via the second operation part.

According to the imaging apparatus of the present disclosure, operability in setting a photography setting condition is improved.

BRIEF DESCRIPTION OF THE DRAWINGS

FIG. 4A is a view illustrating a number of positions achieved by a unit of ⅓ EV within a range of ±3 EV and a range of ±5 EV by a conventional exposure correction dial;

FIG. 4B is a view illustrating a number of positions achieved by a unit of ⅓ EV within a range of ±5 EV by the exposure correction device according to the first exemplary embodiment;

FIG. 7 is a view illustrating a number of positions achieved by a unit of ⅓ EV within a range of ±5 EV by the exposure correction device according to the second exemplary embodiment.

DETAILED DESCRIPTION

Hereinafter, exemplary embodiments will be described in detail with reference to the drawings as appropriate. However, a detailed description more than necessary may be omitted. For example, the detailed description of already well-known matters and the overlap description of substantially identical configurations may be omitted. This is to avoid an unnecessarily redundant description and to facilitate understanding of a person skilled in the art.

First Exemplary Embodiment

A first exemplary embodiment will be described below with reference to the drawings. The first exemplary embodiment describes a digital camera as an example of an imaging apparatus.

[1. Configuration of Digital Camera]

Figure 1:
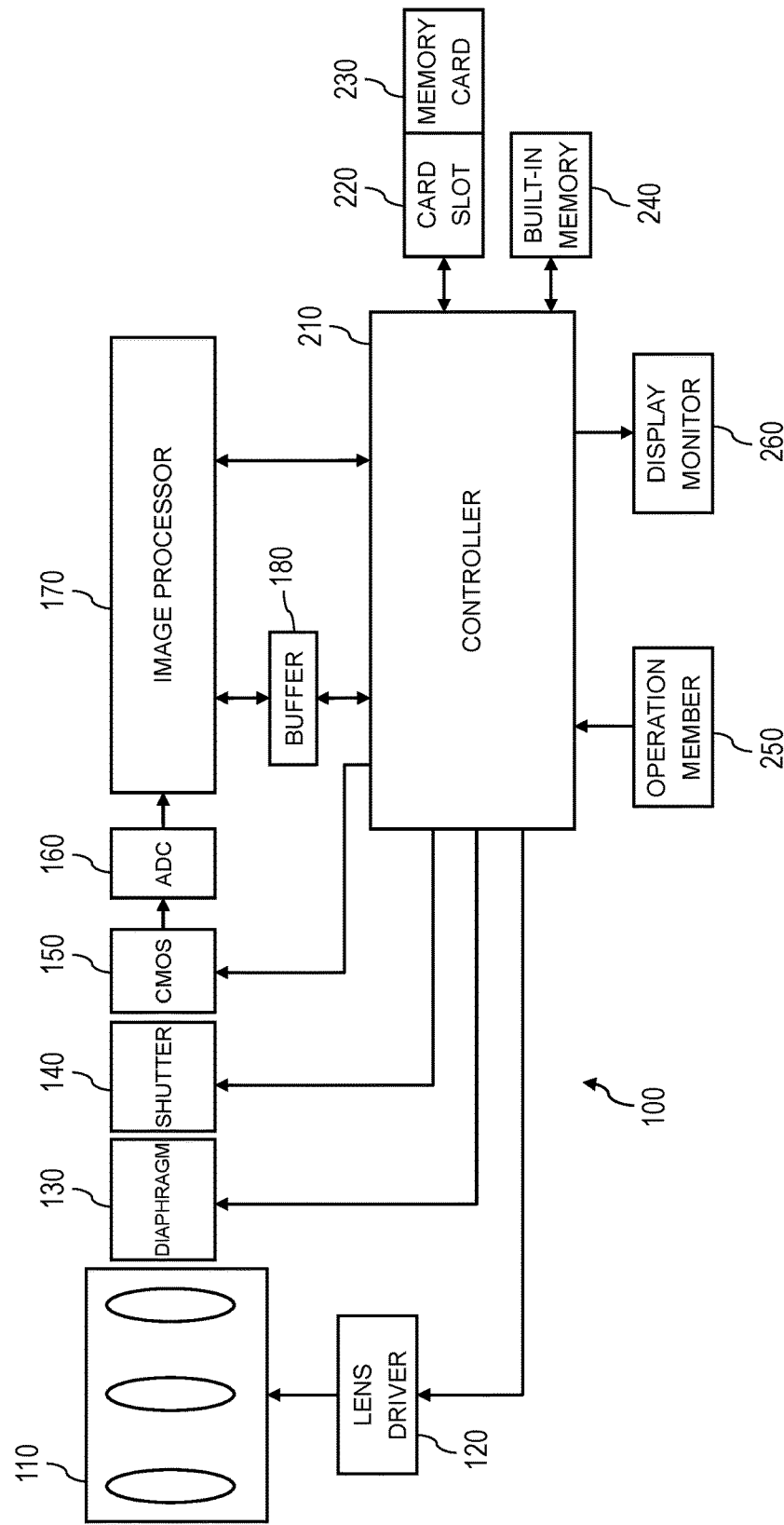
FIG. 1 is a block diagram illustrating a configuration of a digital camera according to a first exemplary embodiment.

First, an example of an electrical configuration of the digital camera according to the first exemplary embodiment will be described with reference to FIG. 1. FIG. 1 is a block diagram illustrating a configuration of digital camera 100. Digital camera 100 is an imaging apparatus that captures a subject image formed via optical system 110 composed of one or more lenses by means of complementary metal oxide semiconductor (CMOS) imaging sensor 150.

Image data generated by CMOS imaging sensor 150 is subjected to various types of processing by image processor 170 and is then stored in memory card 230. The configuration of digital camera 100 will be described in detail below.

Optical system 110 includes a zoom lens and a focus lens. The subject image can be enlarged or reduced by moving the zoom lens along an optical axis. Furthermore, a focus on the subject image can be adjusted by moving the focus lens along the optical axis.

Lens driver 120 drives various kinds of lenses included in optical system 110. Lens driver 120 includes, for example, a zoom motor which drives the zoom lens and a focus motor which drives the focus lens.

Diaphragm 130 adjusts a size of an aperture for light according to a user's setting or automatically to thereby adjust an amount of light transmitting through the aperture.

Shutter 140 is a unit for shielding light to be transmitted to CMOS imaging sensor 150. Shutter 140 constitutes an optical system unit that controls optical information indicating the subject image together with optical system 110 and diaphragm 130.

CMOS imaging sensor 150 captures the subject image formed by optical system 110, and generates image data. CMOS imaging sensor 150 includes a color filter, a light-receiving element, and an auto gain controller (AGC). The light-receiving element converts an optical signal of light collected by optical system 110 into an electrical signal and generates image information. The AGC amplifies the electrical signal output from the light-receiving element. CMOS imaging sensor 150 further includes a drive circuit and the like that perform various kinds of operations such as exposure, transfer, and electronic shutter.

Analog-digital converter (A/D converter: ADC) 160 converts analog image data generated by CMOS imaging sensor 150 into digital image data.

Based on control of controller 210, image processor 170 performs various types of processing on the digital image data generated by CMOS imaging sensor 150 and converted. For example, image processor 170 performs various types of processing such as Gamma correction, white balance correction, and damage correction, on the image data generated by CMOS imaging sensor 150. Furthermore, image processor 170 compresses the image data generated by CMOS imaging sensor 150 according to a compression format that complies with 11.264 standards or MPEG2 standards.

Image processor 170 generates image data to be displayed on display monitor 260. Further, image processor 170 generates image data to be stored in memory card 230.

Image processor 170 can be implemented, for example, by a digital signal processor (DSP) or a microcontroller. Further, image processor 170 can generate image data (4K moving image data) of a still image and a moving image of approximately 4000×2000 pixels based on the image data generated by CMOS imaging sensor 150.

Controller 210 is a control unit that entirely controls digital camera 100. Controller 210 can be achieved by a semiconductor element, for example. Controller 210 may be configured by hardware alone or may be achieved by a combination of hardware and software. Controller 210 can be achieved by, for example, a microcontroller, a central processing unit (CPU), a micro processing unit (MPU), an application specific integrated circuit (ASIC), or a field-programmable gate array (FPGA).

Buffer 180 functions as a work memory of image processor 170 and controller 210. Buffer 180 can be achieved by, for example, a dynamic random access memory (DRAM) or a ferroelectric memory.

Card slot 220 is capable of detachably accepting memory card 230. Memory card 230 can be mechanically and electrically connected to card slot 220.

Memory card 230 includes inside a flash memory or a ferroelectric memory and can store data such as image files generated by image processor 170.

Built-in memory 240 is, for example, a flash memory or a ferroelectric memory. Built-in memory 240 stores a control program for controlling entire digital camera 100, and the like.

Operation member 250 is a generic term of a user interface that receives a user's operation. Operation member 250 includes at least any one of a button, a dial, a lever, a touch panel, and the like.

Display monitor 260 is configured so as to display an image (a through image) indicated by the image data generated by CMOS imaging sensor 150 and an image indicated by image data read from memory card 230. Further, display monitor 260 is configured so as to also display various menu screens for making various settings of digital camera 100. Display monitor 260 is configured by a liquid crystal display device or an organic electro luminescence (EL) display device.

[2. External Configuration of Digital Camera]

Figure 2:
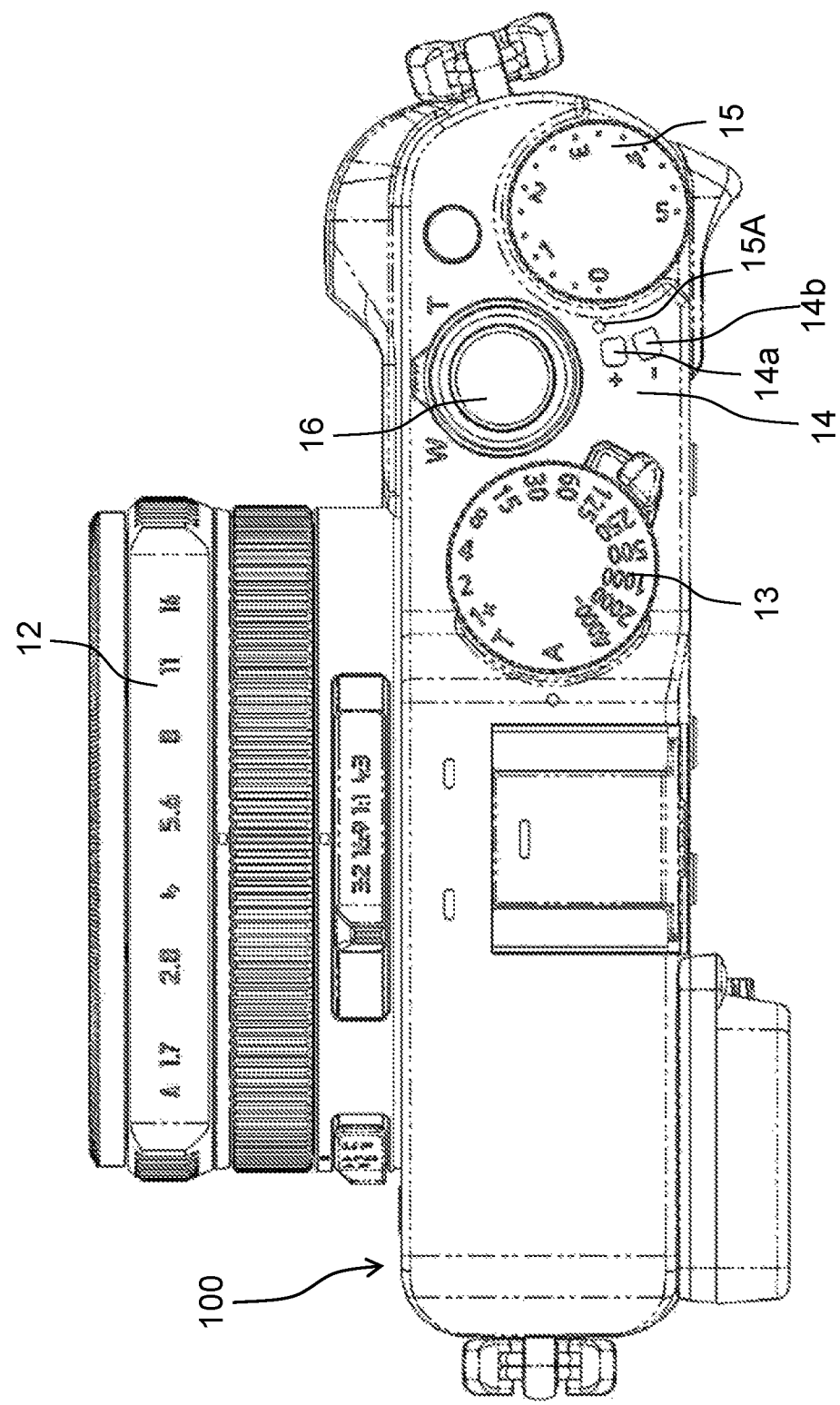
FIG. 2 is a view illustrating an upper surface of the digital camera according to the first exemplary embodiment.

FIG. 2 is a view illustrating an upper surface of digital camera 100. Digital camera 100 is a digital camera in which a lens and a body are integral. As described above, operation member 250 includes a member receiving a user's operation, such as a button, a lever, a dial, or a touch panel. For example, operation member 250 receives a user's operation for making various settings about photography. As illustrated in FIG. 2, operation member 250 includes diaphragm ring 12, shutter speed dial 13, exposure correction lever 14, exposure correction dial 15, shutter button 16, and the like. Exposure correction lever 14 is configured so as to move between two lever positions 14a, 14b. Shutter button 16 is operated when a user instructs photography. Upon receipt of the user's operation, operation member 250 transmits various instruction signals to controller 210.

An exposure correction condition can be set herein by setting of shutter speed dial 13 and diaphragm ring 12. For example, when shutter speed dial 13 is set to AUTO (A) and diaphragm ring 12 is set to AUTO (A), a program auto exposure (AE) mode is selected. In this mode, the camera automatically sets a diaphragm value and a shutter speed according to brightness of a subject. On the other hand, when shutter speed dial 13 is set to a set value desired by a user and diaphragm ring 12 is set to a set value desired by the user, a manual exposure mode is selected.

Shutter button 16 is a two-stage pressing type push button. When the user presses shutter button 16 halfway down, controller 210 executes, for example, autofocus control (AF control) and auto exposure control (AE control). Further, when the user presses shutter button 16 fully down, controller 210 records image data captured at a timing of the pressing operation as a recording image in, for example, memory card 230.

Exposure correction lever 14 and exposure correction dial 15 are used to correct exposure when the subject is in a backlight state or is too bright. An exposure correction value can be selected within a range of −5 EV to +5 EV by using exposure correction lever 14 and exposure correction dial 15.

[3. Configuration of Exposure Correction Device]

FIG. 4A is a view illustrating a number of positions achieved by a unit of ⅓ EV within a range of ±3 EV and a range of ±5 EV by a conventional exposure correction dial. An exposure correction dial of a conventional general digital camera has 19 positions divided by a unit of ⅓ EV within a range of +3 EV to −3 EV. In other words, the conventional exposure correction dial receives selection of 19 numerical values set to a pitch of ⅓ EV and ranging from +3 EV to −3 EV. However, a range that can be set as an exposure correction value is extended from +5 EV to −5 EV due to improvement in performance of a digital camera in recent years. Therefore, as illustrated in a lowermost row in FIG. 4A, the number of positions of the exposure correction value in recent years is 31 in a case where the pitch is ⅓ EV.

When the 31 positions are allocated to a round dial as they are, for example, scales at 36 positions are provided on the dial such that a central angle between the positions becomes 10°. The 31 positions among the 36 positions correspond to the respective exposure correction values allocated by the unit of ⅓ EV.

When a dial diameter of the above-described dial is, for example, ϕ16.9 mm, a movement amount in a tangential direction per one position becomes approximately 1.47 mm from 2.2 mm, and the pitch is narrow. This pitch is an interval between clicks upon rotation of the dial. Accordingly, for example, when a user wants to stop rotation of the dial at an arbitrary position, he/she may pass through the position. The dial has such a problem of operability.

Further, since a number of inner contacts greatly increases along with an increase in positions, a number of parts, such as a changeover resistor, increases. Further, a pattern is refined due to the increase in the number of contacts, thereby making it difficult to manufacture the dial.

Figure 3:
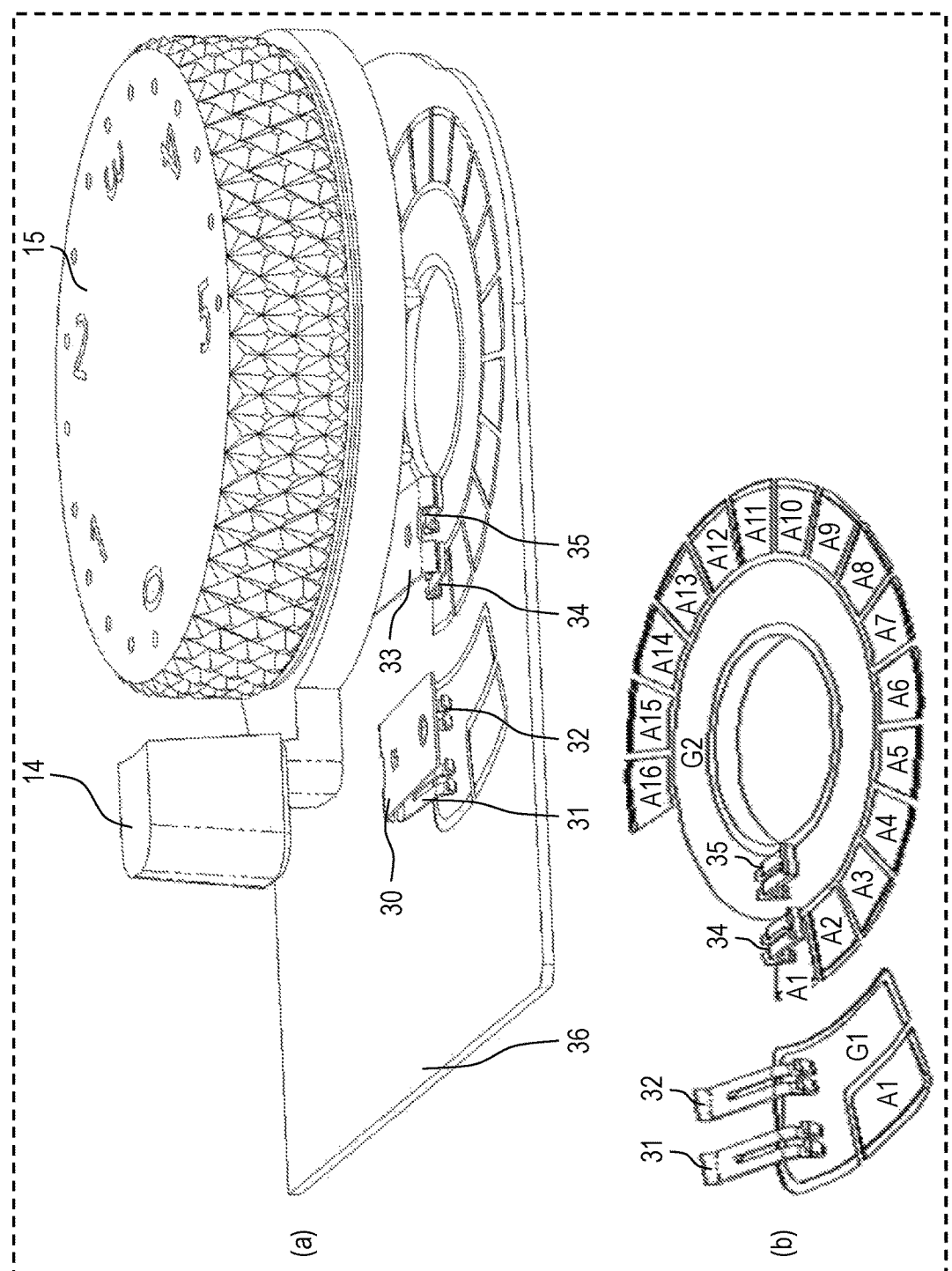
FIG. 3(a) is an exploded perspective view of a main part of an exposure correction device.
FIG. 3(b) is an enlarged view of brushes and regions in the first exemplary embodiment.

Therefore, in the first exemplary embodiment, as illustrated in FIG. 3, the above-described problem is solved by using an exposure correction device including two operation parts. Specifically, the two operation parts are exposure correction lever 14 and exposure correction dial 15. The exposure correction device is configured so as to receive setting of a desired exposure correction value by using these operation parts. A configuration of the exposure correction device according to the first exemplary embodiment will be described below with reference to FIG. 3. Part (a) of FIG. 3 is an exploded perspective view of a main part of the exposure correction device, and part (b) of FIG. 3 is an enlarged view of brushes and regions. The exposure correction device includes a flexible printed circuit (FPC) 36, exposure correction dial 15, and exposure correction lever 14. FPC 36 is disposed inside of digital camera 100. At least a part of exposure correction dial 15 and at least a part of exposure correction lever 14 are exposed to outside of digital camera 100 to receive a user's operation. Exposure correction dial 15 corresponds to a first operation part in the present disclosure. Exposure correction lever 14 corresponds to a second operation part in the present disclosure.

As illustrated in part (a) of FIG. 3, scales of the exposure correction value divided by a unit of ⅓ EV within a range, in which an absolute value ranges from 0 EV to 5 EV, are disposed on an upper surface of exposure correction dial 15. In other words, as illustrated in FIG. 4B, a number of positions of the scales of the exposure correction value in the first exemplary embodiment is 16. Further, mark 15A indicating a reference position is disposed near exposure correction dial 15. The user rotates exposure correction dial 15 such that a desired scale of exposure correction dial 15 faces mark 15A. With this configuration, the user can select a numerical value corresponding to the desired scale by using exposure correction dial 15.

Base 33 formed of a conductive member, such as metal, is disposed on a lower surface of exposure correction dial 15. Further, two brushes 34, 35 are fixed to base 33. Brushes 34, 35 are disposed along a radial direction of exposure correction dial 15. Brushes 34, 35 are also formed of a conductive member, such as metal. Brushes 34, 35 rotate inside of digital camera 100 integrally with exposure correction dial 15 along with rotation of exposure correction dial 15.

Further, as illustrated in part (b) of FIG. 3, brush 34 has two legs, and is conducted to any one of regions A1 to A16 provided in FPC 36. Furthermore, brush 35 has two legs, and is conducted to ground region G2 provided in FPC 36. Each of regions A1 to A16 is disposed with a wiring line that reaches controller 210. These wiring lines each have different internal resistance. Therefore, when exposure correction dial 15 rotates, voltages different from each other according to regions A1 to A16, at which brush 34 is located, are output to controller 210. Controller 210 determines which scale of exposure correction dial 15 is aligned with mark 15A based on a signal output from exposure correction dial 15.

In the first exemplary embodiment, when a dial diameter of exposure correction dial 15 is φ16.9 mm and the number of positions of exposure correction dial 15 is 16, a rotation pitch between clicks that is necessary to change the scale of exposure correction dial 15 by one position is 18°, and a necessary movement amount in a tangential direction is 2.65 mm.

Further, exposure correction lever 14 can be switched to lever positions 14a, 14b according to the user's operation. Lever position 14a is indicated as a plus (+) on the surface of digital camera 100. Lever position 14b is indicated as a minus (−) on the surface of digital camera 100.

Base 30 formed of a conductive member, such as metal, is disposed on the lower surface of exposure correction lever 14. Two brushes 31, 32 are fixed to base 30. Brush 31 has two legs, and is conducted to either of ground region G1 and region A1 provided in FPC 36. Brush 32 has two legs, and is conducted to ground region G1 provided in FPC 36. Ground region G1 and region A1 are disposed with wiring lines that reach controller 210. These wiring lines have internal resistance different from each other.

When exposure correction lever 14 is operated, bushes 31, 32 move inside of digital camera 100 along with movement of exposure correction lever 14. Therefore, when exposure correction lever 14 is operated, voltages different from each other according to either of ground region G1 and region A1, at which brush 31 is located, are output to controller 210.

[4. Operation]

When the user wants to set an exposure correction value, he/she sets exposure correction dial 15 and exposure correction lever 14 to desired positions.

Based on the signal output from exposure correction dial 15, controller 210 determines which scale among the scales at 16 positions disposed on exposure correction dial 15 is aligned with mark 15A. In other words, controller 210 determines which position among the 16 positions illustrated in a lower row of a table in FIG. 4B is set.

Further, based on the signal output from exposure correction lever 14, controller 210 determines whether exposure correction lever 14 is located at a position indicating the plus or a position indicating the minus.

When exposure correction lever 14 is located at a plus position, controller 210 multiplies a numerical value selected by exposure correction dial 15 by plus 1. On the other hand, when exposure correction lever 14 is located at a minus position, controller 210 multiplies the numerical value selected by exposure correction dial 15 by minus 1. In other words, controller 210 executes the operation selected by exposure correction lever 14 on the numerical value selected by exposure correction dial 15, and thus calculates the exposure correction value. The exposure correction value corresponds to the set value in the present disclosure. Controller 210 controls the diaphragm and the shutter speed based on the calculated exposure correction value.

[5. Effects and Others]

As described above, digital camera 100 (an example of an imaging apparatus) according to the first exemplary embodiment includes exposure correction dial 15 (an example of a first operation part), exposure correction lever 14 (an example of a second operation part), and controller 210 (an example of a controller). Exposure correction dial 15 receives selection of a first numerical value from a first numerical value group that specifies an exposure correction condition (an example of a photography setting condition). Exposure correction lever 14 receives selection of an operation from an operation group for the first numerical value. Controller 210 determines an exposure correction value (an example of a set value) set by combining the first numerical value selected via exposure correction dial 15 and the operation selected via exposure correction lever 14.

With this configuration, in the first exemplary embodiment, the photography setting condition can be set to a desired set value by using two operation parts (that is, the first operation part and the second operation part). For example, when the exposure correction value is set within a range from −5 EV to +5 EV, conventionally, the one operation part requires the scales at 31 positions, as illustrated in the lowermost row in FIG. 4A. Meanwhile, in the first exemplary embodiment, the scales at 16 positions are sufficient, as illustrated in FIG. 4B. Therefore, compared with a case where a single operation part is used for setting, a pitch of the operation part can be increased even when a range of numerical values that can be set is widened. As a result, operability can be improved. Further, miniaturization and lightweight are achievable in a case where the dial can be made small.

Further, in the first exemplary embodiment, the first numerical value group is a group of numerical values that are set to a first pitch and whose respective absolute values range from zero to a predetermined value. Specifically, the first numerical value group is a group of numerical values that are divided by a unit of an absolute value of ⅓ EV within a range of numerical values whose respective absolute values range from 0 EV to 5 EV. ⅓ EV corresponds to the first pitch in the present disclosure. Further, "an operation group for the first numerical value" in the first exemplary embodiment includes an operation in which the numerical value set by exposure correction dial 15 is multiplied by a plus numerical value and an operation in which the numerical value is multiplied by a minus numerical value. It should be noted that an operation in which the numerical value is divided by the plus numerical value is included in the operation in which the numerical value is multiplied by the plus numerical value. Moreover, an operation in which the numerical value is divided by the minus numerical value is included in the operation in which the numerical value is multiplied by the minus numerical value.

With this configuration, for example, when a user wants to correct exposure so as to brighten an image, he/she operates exposure correction lever 14 to switch lever position 14a to the plus. Then, when the user sets a desired absolute value by exposure correction dial 15, a plus exposure correction value can be set. Therefore, even when the range of the exposure correction value that can be selected is increased, the pitch between clicks can be widened, and operability can be improved.

It should be noted that, in the first exemplary embodiment, the plus numerical value multiplied by the first numerical value is plus 1, and the minus numerical value multiplied by the first numerical value is minus 1. However, the numerical values may be appropriately changed. Further, the first numerical value group is the group of the numerical values whose respective absolute values range from zero to the predetermined value. However, the numerical value group may be a numerical value group in which a value ranges from zero to a plus predetermined value, or may be a numerical value group in which a value ranges from zero to a minus predetermined value.

Further, exposure correction lever 14 is a two-stage changeover lever for switching the position to either of the plus position and the minus position. A two-stage changeover switch may be used instead of exposure correction lever 14. These lever and switch can improve user's operability.

Second Exemplary Embodiment

[1. Configuration of Digital Camera]

Since an electrical configuration of a digital camera according to a second exemplary embodiment is identical to the electrical configuration of the digital camera in the first exemplary embodiment, a description of the electrical configuration is omitted.

[2. External Configuration of Digital Camera]

Figure 5:
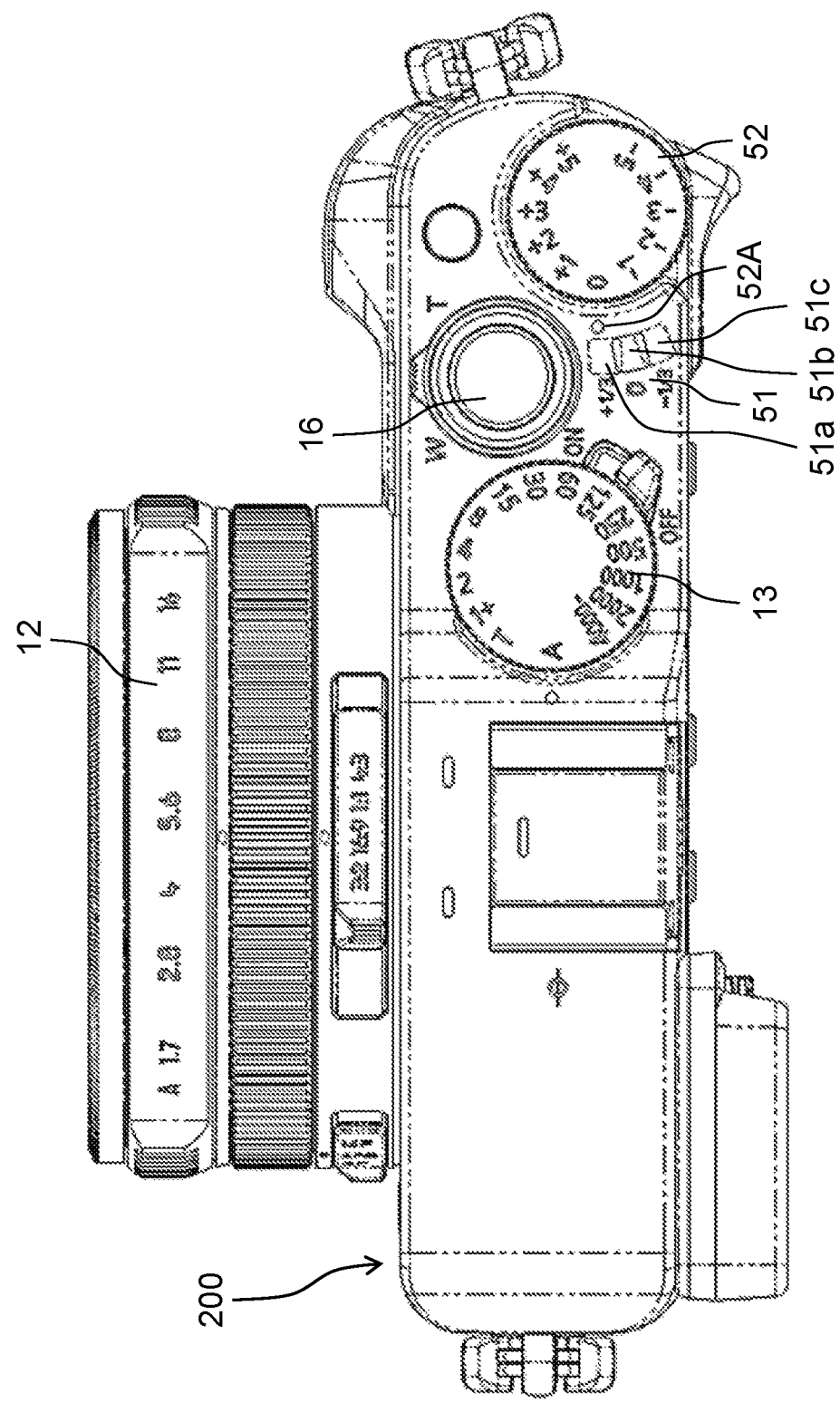
FIG. 5 is a view illustrating an upper surface of a digital camera according to a second exemplary embodiment.

FIG. 5 is a view illustrating an upper surface of digital camera 200 according to the second exemplary embodiment. Digital camera 200 is a digital camera in which a lens and a body are integral. Parts different from the parts in the first exemplary embodiment will be mainly described below. An exposure correction device in the second exemplary embodiment includes exposure correction lever 51 and exposure correction dial 52. Exposure correction dial 52 corresponds to a first operation part in the present disclosure. Exposure correction lever 51 corresponds to a second operation part in the present disclosure. Exposure correction lever 51 has three lever positions 51a, 51b, 51c.

Exposure correction lever 51 and exposure correction dial 52 are used to correct exposure when a subject is in a backlight state, a photography environment is too bright, or the like. An exposure correction value can be selected within a range of −5 EV to +5 EV by using exposure correction lever 51 and exposure correction dial 52.

[3. Configuration of Exposure Correction Device]

Figure 6:
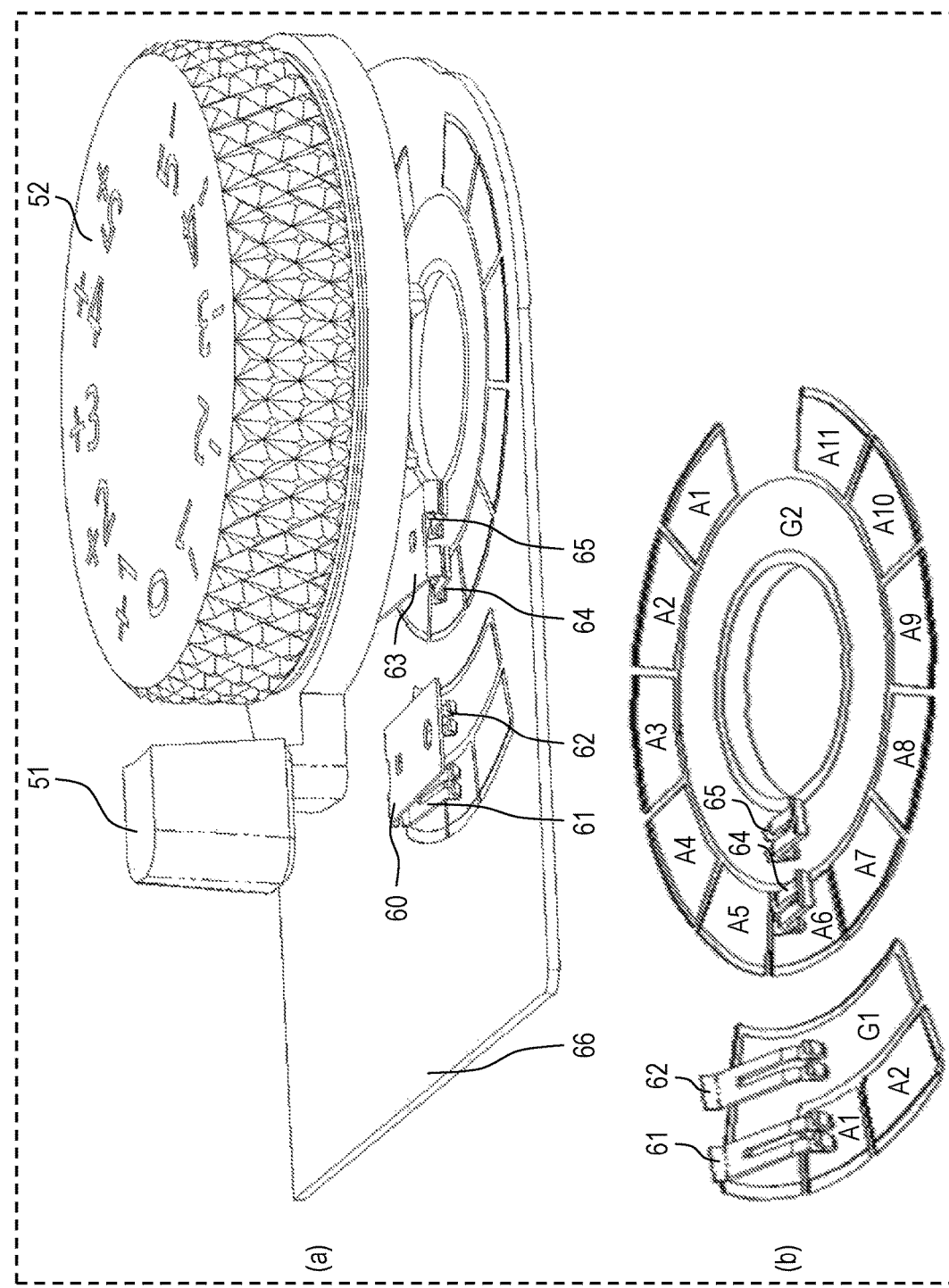
FIG. 6(a) is an exploded perspective view of a main part of an exposure correction device.
FIG. 6(b) is an enlarged view of brushes and regions in the second exemplary embodiment.

A configuration of the exposure correction device according to the second exemplary embodiment will be described below with reference to FIG. 6. Part (a) of FIG. 6 is an exploded perspective view of a main part of the exposure correction device, and part (b) of FIG. 6 is an enlarged view of brushes and regions. The exposure correction device includes FPC 66, exposure correction dial 52, and exposure correction lever 51. FPC 66 is disposed inside of the digital camera. At least a part of exposure correction dial 52 and at least a part of exposure correction lever 51 are disposed so as to be exposed to outside of the digital camera to receive a user's operation.

As illustrated in part (a) of FIG. 6, scales of the exposure correction value divided by a unit of 1 EV within a range from −5 EV to +5 EV are disposed on an upper surface of exposure correction dial 52. In other words, as illustrated in FIG. 7, a number of positions of the scales of the exposure correction value is 11. Further, mark 52A indicating a reference position is disposed near exposure correction dial 52. The user rotates exposure correction dial 52 such that a desired scale of exposure correction dial 52 faces mark 52A. With this configuration, the user can select a numerical value corresponding to the desired scale by using exposure correction dial 52.

Base 63 formed of a conductive member, such as metal, is disposed on a lower surface of exposure correction dial 52. Further, two brushes 64, 65 are fixed to base 63. These brushes 64, 65 are disposed along a radial direction of exposure correction dial 52. Brushes 64, 65 are also formed of a conductive member, such as metal. Brushes 64, 65 rotate inside of the digital camera integrally with exposure correction dial 52 along with rotation of exposure correction dial 52.

Further, as illustrated in part (b) of FIG. 6, brush 64 has two legs, and is conducted to any one of regions A1 to A11 provided in FPC 66. Brush 65 has two legs, and is conducted to ground region G2 provided in FPC 66. Each of regions A1 to A11 is disposed with a wiring line that reaches controller 210. These wiring lines each have different internal resistance. Therefore, when exposure correction dial 52 rotates, different voltages according to regions A1 to A11, at which brush 64 is located, are output to controller 210. Based on a signal output from exposure correction dial 52, controller 210 determines which scale of exposure correction dial 52 is aligned with mark 52A.

In the second exemplary embodiment, when a dial diameter of exposure correction dial 52 is ϕ16.9 mm and the number of positions of exposure correction dial 52 is 11, a rotation pitch between clicks that is necessary to change the scale of exposure correction dial 52 by one position is 30°, and a necessary movement amount in a tangential direction is 4.42 mm.

Further, exposure correction lever 51 can be switched to lever positions 51a, 51b, 51c according to the user's operation. Lever position 51a is indicated as +⅓ on a surface of the digital camera. Lever position 51b is indicated as 0 on the surface of the digital camera. Lever position 51c is indicated as −⅓ on the surface of the digital camera.

Base 60 formed of a conductive member, such as metal, is disposed on the lower surface of exposure correction lever 51. Two brushes 61, 62 are fixed to base 60. Brush 61 has two legs, and is conducted to any one of ground region G1, region A1, and region A2 provided in FPC 66. Furthermore, brush 62 has two legs, and is conducted to ground region G1 provided in FPC 66. Ground region G1, region A1, and region A2 are disposed with wiring lines that reach controller 210. These wiring lines each have different internal resistance.

When exposure correction lever 51 is operated, bushes 61, 62 move inside of digital camera 200 along with movement of exposure correction lever 51. Therefore, when exposure correction lever 51 is operated, voltages different from each other according to any one of region G1, region A1, and region A2, at which brush 61 is located, are output to controller 210.

[4. Operation]

When the user wants to set the exposure correction value, he/she sets exposure correction dial 52 and exposure correction lever 51 to desired positions.

Based on the signal output from exposure correction dial 52, controller 210 determines which scale among the scales at 11 positions disposed on exposure correction dial 52 is aligned with mark 52A. In other words, controller 210 determines which position among the 11 positions illustrated in a lower row of a table in FIG. 7 is set.

Further, based on the signal output from exposure correction lever 51, controller 210 determines whether exposure correction lever 51 is located at a position indicating any of +⅓, 0, −⅓.

When exposure correction lever 51 is located at a +⅓ position, controller 210 adds ⅓ EV to the numerical value selected by exposure correction dial 52. On the other hand, when exposure correction lever 51 is located at a 0 position, controller 210 maintains the numerical value selected by exposure correction dial 52 as it is. Moreover, when exposure correction lever 51 is located at a −⅓ position, controller 210 subtracts ⅓ EV from the numerical value selected by exposure correction dial 52. Alternatively, when exposure correction lever 51 is located at the ⅓ position, controller 210 adds −⅓ EV to the numerical value selected by exposure correction dial 52. In other words, controller 210 executes an operation corresponding to the position of exposure correction lever 51 on the numerical value selected by exposure correction dial 52, and thus calculates the exposure correction value. The exposure correction value corresponds to a second numerical value in the present disclosure. Controller 210 controls a diaphragm and a shutter speed based on the calculated exposure correction value.

[5. Effects and Others]

As described above, a digital camera (an example of an imaging apparatus) according to the second exemplary embodiment includes exposure correction dial 52 (an example of a first operation part), exposure correction lever 51 (an example of a second operation part), and controller 210 (an example of a controller). Exposure correction dial 52 receives selection of a first numerical value from a first numerical value group that specifies an exposure correction condition (an example of a photography setting condition). Exposure correction lever 51 receives selection of an operation from an operation group for the first numerical value. Controller 210 determines an exposure correction value (an example of a set value) set by combining the first numerical value selected via exposure correction dial 52 and the operation selected via exposure correction lever 51.

With this configuration, also in the second exemplary embodiment, even when a range of a photography setting condition that can be set is widened, a pitch between clicks of exposure correction dial 52 can be widened, thereby improving operability. For example, when the exposure correction value is set within a range from −5 EV to +5 EV, conventionally, as illustrated in the lowermost row in FIG. 4A, the one operation part requires the scales at 31 positions. Meanwhile, in the second exemplary embodiment, the scales at 11 positions are sufficient, as illustrated in FIG. 7. Therefore, compared with a case where a single operation part is used for setting, a pitch of the operation part can be increased even when a range of numerical values that can be set is widened. As a result, operability can be improved. Further, miniaturization and lightweight are achievable in a case where the dial can be made small.

Further, in the second exemplary embodiment, exposure correction dial 52 receives the selection from the first numerical value group set to a first pitch. In the second exemplary embodiment, the first numerical value group is a group of numerical values divided by a unit of 1 EV within a range from −5 EV to +5 EV. 1 EV is an example of the first pitch in the present disclosure. Moreover, the second numerical value is selected from a second numerical value group set to a second pitch. Exposure correction lever 51 is configured so as to receive selection from an operation group including at least one of an operation of adding the second numerical value to the first numerical value and an operation of subtracting the second numerical value from the first numerical value. The second pitch is a value smaller than the first pitch. For example, the second pitch is ⅓ EV in the second exemplary embodiment. Further, the second numerical value group includes, for example, −⅓, 0, +⅓.

With this configuration, in the second exemplary embodiment, for example, when the user wants to correct exposure so as to brighten an image, he/she operates exposure correction dial 52 to select the exposure correction value by a unit of 1 EV. Moreover, the user can adjust the exposure correction value by a unit of ⅓ EV by the exposure correction lever. Therefore, even when the range of exposure correction value that can be selected is increased, the pitch between clicks of exposure correction dial 52 can be widened, thereby improving operability.

In the second exemplary embodiment, a switch divided by a unit of ⅓ EV may be used instead of exposure correction lever 51. Operability is improved by using the lever or the switch.

Other Exemplary Embodiments

The first and second exemplary embodiments have been described above as an example of the technique disclosed in the present application. However, the technique according to the present disclosure is not limited to the first and second exemplary embodiments, but is applicable to other exemplary embodiments including appropriate modifications, replacements, additions, omissions and the like. In addition, new exemplary embodiments can be implemented by combining the constituent elements described above in the first and second exemplary embodiments.

The above exemplary embodiments have described an example in which the imaging apparatus of the present disclosure is applied to digital cameras 100, 200 in which the lens and the body are integral. However, the imaging apparatus of the present disclosure can be applied also to an interchangeable lens type digital camera.

In the above first exemplary embodiment, the second operation part (exposure correction lever 14) is configured by the two-stage switchable lever for setting multiplication of a plus (+) or minus (−) numerical value. However, the second operation part may be configured by a two-stage changeover switch for setting multiplication of a + or − numerical value. Moreover, the second operation part may be configured by a simple switch. In this case, the second operation part may be a switch that changes multiplication of + and − numerical values every time the switch is pressed down.

Similarly, in the second exemplary embodiment, the second operation part is the lever or the switch that receives setting of at least one of the operation of adding the predetermined pitch to the first numerical value and the operation of subtracting the predetermined pitch from the first numerical value. However, the second operation part may be configured by a simple switch. In this case, the switch may have a configuration that receives selection of an operation of adding a predetermined pitch to a first numerical value or an operation of subtracting the predetermined pitch from the first numerical value every time the switch is pressed down.

Further, in the above first and second exemplary embodiments, the first operation part is the dial. However, the first operation part may employ another configuration, such as a lever or a switch.

Moreover, in the above first and second exemplary embodiments, the photography setting condition is setting of the exposure correction. However, the photography setting condition may be various setting conditions, such as an International Organization for Standardization (ISO) sensitivity, white balance, and shutter speed.

An imaging apparatus according to the present disclosure can be applied to an imaging apparatus (such as a video camera, a movie camera, a smartphone, or an electronic terminal equipped with a camera) capable of setting a desired numerical value by using two operation parts.

What is claimed is:

1. An imaging apparatus comprising:
   a first operation part for receiving selection of a first numerical value from a first numerical value group that specifies a photography setting condition;
   a second operation part for receiving selection of an operation from an operation group for the first numerical value; and
   a controller which determines a set value set by combining the first numerical value selected via the first operation part and the operation selected via the second operation part;
   wherein the first operation part receives the selection from the first numerical value group set to a first interval and ranging from zero to a predetermined value, and
   wherein the second operation part is configured to receive the selection from the operation group including the operation in which the first numerical value is multiplied by a plus numerical value and the operation in which the first numerical value is multiplied by a minus numerical value.

2. The imaging apparatus according to claim 1, wherein the first operation part is a dial for receiving the selection from the first numerical value group set to the first interval, and
   the second operation part is either one of a two-stage changeover lever and a two-stage changeover switch for receiving the selection from the operation group.

3. The imaging apparatus according to claim 1, wherein the photography setting condition is an exposure correction condition.

4. An imaging apparatus comprising:
   a first operation part for receiving selection of a first numerical value from a first numerical value group that specifies a photography setting condition;
   a second operation part for receiving selection of an operation from an operation group for the first numerical value; and
   a controller which determines a singular set value set by combining the first numerical value selected via the first operation part and the operation selected via the second operation part, wherein:
      the first operation part receives the selection from the first numerical value group set to the first interval,
      the second operation part is configured so as to receive the selection from the operation group including at least one of the operation of adding, to the first numerical value, a second numerical value selected from a second numerical value group set to a second interval and the operation of subtracting the second numerical value from the first numerical value,
      the second interval is smaller than the first interval, and
      the controller is configured to set the singular set value when the second operation part receives the selection to add or subtract the second numerical value, the second numerical value being not zero, from the second numerical value group.

5. The imaging apparatus according to claim 4, wherein the first operation part is a dial for receiving the selection from the first numerical value group set to the first interval and ranging from a minus predetermined value to a plus predetermined value, and
   the second operation part is either one of a lever and a switch for receiving the selection from the operation group.

* * * * *